United States Patent [19]
Gregory

[11] 3,950,128
[45] Apr. 13, 1976

[54] DISAZO DYESTUFFS

[75] Inventor: Peter Gregory, Manchester, England

[73] Assignee: Imperial Chemical Industries Limited, London, England

[22] Filed: May 11, 1973

[21] Appl. No.: 359,542

[30] Foreign Application Priority Data
June 14, 1972 United Kingdom............... 27744/72

[52] U.S. Cl. .............................. 8/26; 8/1 B; 8/1 E; 8/41 R; 8/51; 260/153
[51] Int. Cl.² C09B 27/00; C09B 45/48; D06P 1/02; D06P 3/00
[58] Field of Search .......... 8/26, 1 B, 1 E, 41 R, 51; 260/153

[56] References Cited
UNITED STATES PATENTS

| | | | |
|---|---|---|---|
| 3,050,515 | 8/1962 | Gunst | 260/153 |
| 3,165,506 | 1/1965 | Gunst | 260/153 |
| 3,340,247 | 9/1967 | Riat et al. | 260/153 |

Primary Examiner—Leland A. Sebastian
Assistant Examiner—T. S. Gron
Attorney, Agent, or Firm—Cushman, Darby & Cushman

[57] ABSTRACT

Disazo dyestuffs of the formula:

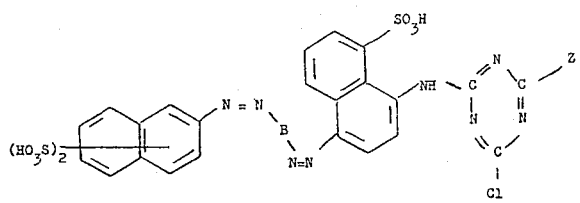

wherein B represents a 1,4-phenylene radical which may be substituted by $CH_3$, $OCH_3$, $NHCOCH_3$ or $NHCONH_2$ or a 1,4-naphthylene radical which may be substituted by $OCH_3$ or $SO_3H$, and Z represents $NH_2$ or $OCH_3$, and their manufacture by conventional condensation methods. These dyes are brown cellulose-reactive dyes, (including bluish-brown, orange-brown and reddish-brown shades) which exhaust well on to the fibre from saline dyebaths with high fixation of the absorbed dye, so that deep shades of high tinctorial strength can be obtained; the resulting shades have excellent fastness to light and to washing tests, in which latter there is a remarkably low level of staining, and above all, excellent fastness to bleach treatments.

5 Claims, No Drawings

DISAZO DYESTUFFS

This invention relates to new disazo dyestuffs useful for the coloration of cellulose textile materials in reddish-brown shades.

According to the invention, there are provided disazo dyestuffs of the formula:

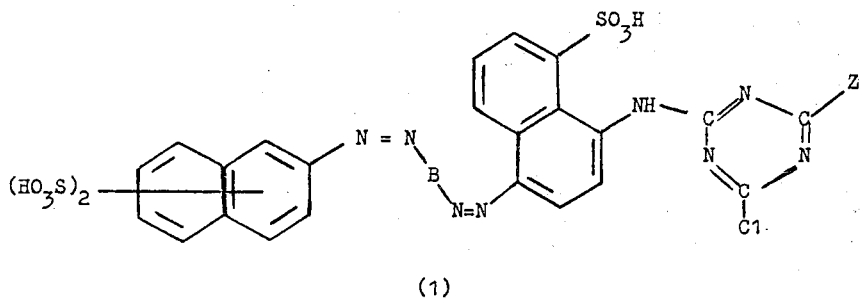

(1)

wherein Z has the meaning stated above, the SO₃H group in the central naphthalene nucleus being in the 6- or 7- position relative to either azo group, these dyestuffs or mixtures thereof having particularly outstanding tinctorial strength and build-up properties.

The invention also provides a process for manufacture of the new dyestuffs which comprises reacting together an aminoazo compound of the formula:

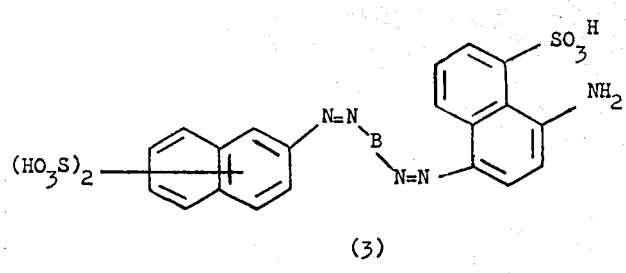

(3)

wherein B has the meaning stated above, with one mole of 2,4-dichloro-6-methoxy-s-triazine or 2,4-dichloro-6-amino-s-triazine.

The above process can conveniently be carried out by stirring the reactants in aqueous medium at a temperature of 30° to 50°C, preferably maintaining the pH of the medium at from 6.5 to 7.5 by adding an acid-binding agent, e.g. sodium bicarbonate, sodium carbonate, or sodium hydroxide, to neutralize the hydrochloric acid formed during the reaction.

The invention also provides a modified process for manufacture of the new dyestuffs in which Z represents the NH₂ group, which comprises reacting cyanuric chloride with one mole of an aminoazo compound of formula (3) and reacting the resultant product with one mole of ammonia.

This modified process is also most conveniently carried out in an aqueous medium at a pH of from 6.5 to 7.5, the first stage being preferably carried out at 0°–10°C., and the second at from 30° to 40°C. In the second stage, an excess of ammonia can be used, if desired, to act as acid-binding agent.

The aminoazo compounds of formula (3) can be obtained by coupling the diazonium salt of a 2-aminonaphthalene disulphonic acid with an amine of the formula BNH₂, and diazotizing the resultant amino monoazo compound and coupling with 1-aminonaphthalene-8-sulphonic acid.

As examples of 2-aminonaphthalene disulphonic

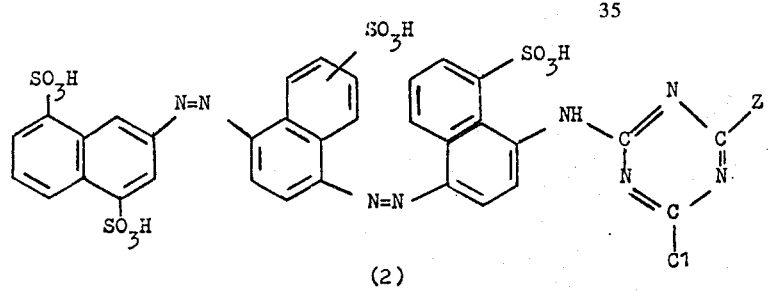

(2)

acids which may be used, there may be mentioned the 1,5- 3,6- 3,7- 4,8- 5,7 and 6,8- disulphonic acids.

As examples of amines of formula BNH₂ which may be used, there may be mentioned:
aniline
m-toluidine
m-aminoacetanilide
m-aminophenylurea
cresidine
2,5-dimethoxyaniline
2,5-dimethylaniline
o- and m-anisidines
1-aminonaphthalene-6- and 7-sulphonic acids and mixtures thereof.

The new dyestuffs can be isolated from the reaction mixtures in which they have been formed by the usual techniques adopted for isolation of water-soluble reactive dyestuffs, for example, by salting out and filtration, or by spray-drying the reaction mixture in which the dyestuff has been formed. If desired, stabilizers e.g. mixtures of alkali metal hydrogen phosphates can be added.

The new reactive dyestuffs are valuable for coloring cellulose textile materials, e.g. textile materials comprising natural or regenerated cellulose such as cotton, linen and viscose rayon. For coloring such materials, the new dyestuffs are preferably applied, either by a printing but preferably a dyeing process to the cellulose textile material in conjunction with a treatment with an acid binding agent, e.g. caustic soda, sodium carbonate, silicate or bicarbonate, which may be applied to the material before, during or after the application of the dyestuff. When so applied the new dyestuffs react with the cellulose and yield brown shades having excellent fastness to washing and to bleach treatments. They are notable for the high proportion which fixes on the material especially when applied from saline dyebaths and for the low degree of staining of adjacent undyed material either while washing off unfixed dyestuff or during washing tests.

The invention is illustrated but not limited by the following examples in which parts are by weight.

EXAMPLE 1

50 parts of a 13.8% solution of sodium nitrite are added to a solution of 30.3 parts of 2-aminonaphthalene-4,8-disulphonic acid in 400 parts of water and the mixture is cooled to 10°C. and added during 15 minutes to a stirred mixture of 100 parts of ice and 40 parts of aqueous hydrochloric acid (s.g. 1.18). The mixture is stirred for 1 hour, then excess nitrous acid is removed by adding sulphamic acid and 21 parts of an approximately 1:1 mixture of 1-aminonaphthalene-6- and 7-sulphonic acids are added, followed by sufficient sodium acetate to bring the pH of the mixture to 4. The mixture is then stirred for 2 hours at 15°–20°C and the precipitate is filtered off and dried.

26.9 parts of the product are dissolved in 400 parts of water at pH 7–8 and 25 parts of a 13.8% solution of sodium nitrite are added. The mixture is added during 15 minutes to a stirred mixture of 100 parts of ice and 25 parts of aqueous hydrochloric acid (s.g. 1.18) and the mixture is stirred for 1 hour. Excess nitrous acid is then removed by addition of sulphamic acid and 11.2 parts of 1-aminonaphthalene-8-sulphonic acid are added, followed by sufficient sodium acetate to give a pH of 4–5. The mixture is stirred at 15°–20°C for 4 hours then salt is added to give a concentration of 100g/l and the precipitate is filtered off and dried at 40°C.

To a solution of 15.4 parts of the product in 300 parts of water at 10°C there is added a solution of 6.5 parts of cyanuric chloride in 50 parts of acetone during 30 minutes, keeping the pH at 6.5 – 7.5 by addition of 8% aqueous sodium hydroxide solution. The mixture is stirred at 0°–10°C for 1 hour, then 10 parts of ammonia solution (s.g. 0.88) are added and the mixture is stirred at 35°–40°C for 4 hours. Salt is added to give a concentration of 150g/l and the precipitate is filtered off and dried.

When applied to cellulose textile materials in conjunction with an acid-binding agent, the dyestuff gives a deep red-brown shade having excellent fastness to light, washing and bleaching agents.

Dyestuffs of similar shade and properties to that in Example 1 are obtained if 1-naphthylamine-6-sulphonic acid or 1-naphthylamine-7-sulphonic acid are used instead of the mixture of these acids.

EXAMPLE 2

7.7 parts of the aminodisazo compound described in paragraph 2 of Example 1 are dissolved in 200 parts of water at pH 7–8 and the solution is stirred at a temperature of 40°–45°C.

A solution of 2.8 parts of 2,4-dichloro-6-methoxy-s-triazine in 25 parts of acetone is added to the solution and the mixture is stirred for 4 hours, the pH being maintained at 6.5 – 7.5 by addition of an aqueous 8% solution of sodium hydroxide. The solution is filtered and salt added to give a concentration of 100g/l. The product is filtered off, washed with 10% brine and dried at 40°C.

When applied to cellulose textile materials in conjunction with an acid-binding agent, the dyestuff gives a mid-brown shade (yellower than the dyestuff from Example 1) having excellent fastness to light, washing and bleaching agents.

Other dyestuffs prepared in a similar manner to those described in Example 1 and 2 are given in the following Table, the hues obtained on cellulose being shown in the final column.

Column II names the amino naphthalene disulphonic acid used, column III the middle component and column IV the final reactant. For brevity the term "mixed Cleves Acid" is used to denote an approximate 1:1 mixture of 1-aminonaphthalene-6- and 7-sulphonic acids:

| I Example | II 2-aminonaphthalene- | III | IV | |
|---|---|---|---|---|
| 3 | 3,6-disulphonic acid | mixed Cleves Acid | cyanuric chloride then ammonia | red brown |
| 4 | 4,8-disulphonic acid | cresidine | do. | mid brown |
| 5 | do. | 2,5-dimethoxyaniline | do. | bluish brown |
| 6 | 1,5-disulphonic acid | mixed Cleves Acid | do. | red brown |
| 7 | 6,8-disulphonic acid | do. | do. | do. |
| 8 | 5,7-disulphonic acid | do. | do. | do. |
| 9 | 4,8-disulphonic acid | 2,5-dimethylaniline | do. | orange-brown |
| 10 | do. | m-anisidine | do. | do. |
| 11 | do. | cresidine | 2,4-dichloro-6-methoxy-s-triazine | mid brown |
| 12 | 3,7-disulphonic acid | 1,7-Cleves acid | cyanuric chloride then ammonia | red brown |
| 13 | 5,7-disulphonic acid | aniline | do. | orange-brown |
| 14 | 4,8-disulphonic acid | m-toluidine | do. | orange-brown |
| 15 | 6,8-disulphonic acid | m-aminoacetanilide | do. | red brown |
| 16 | 4,8-disulphonic acid | m-aminophenylurea | do. | red brown |
| 17 | 1,5-disulphonic acid | m-anisidine | do. | red brown |
| 18 | 6,8-disulphonic acid | 1,6-Cleves acid | do. | red brown |

We claim:
1. A disazo dyestuff of the formula:

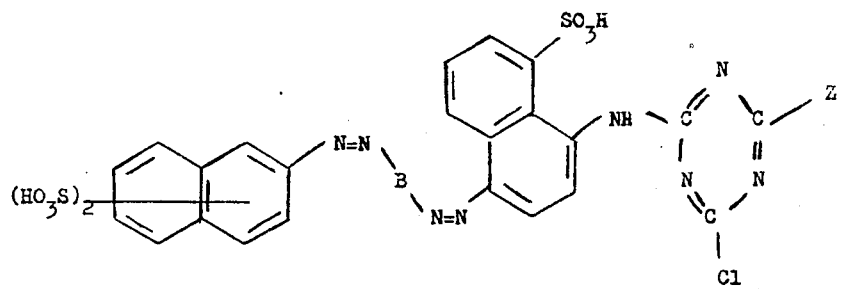

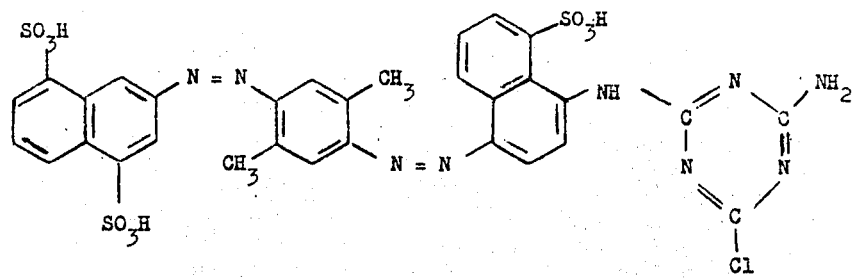

wherein B is a member of the group consisting of 1,4-phenylene, 1,4-naphthylene, 1,4-phenylene carrying 1 or 2 substituents from the class consisting of $CH_3$, $OCH_3$, $NHCOCH_3$ and $NHCONH_2$, and 1,4-naphthylene substituted by $SO_3H$ in the 6- or 7-pisition, and Z is $NH_2$ or $OCH_3$.

2. A disazo dyestuff as claimed in claim 1 having the formula:

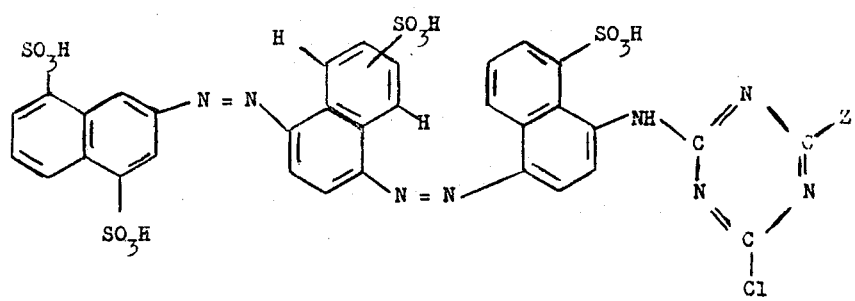

wherein Z is $OCH_3$ or $NH_2$.

3. A mixture of the two disazo dyestuffs claimed in claim 2 in which Z represents $OCH_3$.

4. A mixture of the two disazo dyestuffs claimed in claim 2 in which Z represents $NH_2$.

5. A disazo dyestuff as claimed in claim 1 having the formula:

* * * * *